United States Patent [19]

Nagata et al.

[11] Patent Number: 6,117,551
[45] Date of Patent: Sep. 12, 2000

[54] CARBON FIBER PREPREG, AND A PRODUCTION PROCESS THEREOF

[75] Inventors: Hideo Nagata, Shiga; Nobuyuki Odagiri, Kanagawa; Takeshi Terashita, Ehime; Hajime Kishi, Ehime; Shoji Yamane, Ehime, all of Japan

[73] Assignee: Toray Industries, Inc., Japan

[21] Appl. No.: 09/125,124

[22] PCT Filed: Dec. 16, 1997

[86] PCT No.: PCT/JP97/04642

§ 371 Date: Aug. 11, 1998

§ 102(e) Date: Aug. 11, 1998

[87] PCT Pub. No.: WO98/26912

PCT Pub. Date: Jun. 25, 1998

[30] Foreign Application Priority Data

Dec. 18, 1996 [JP] Japan ................................. 8-338477

[51] Int. Cl.[7] .............................. B32B 5/16; B32B 9/06; B32B 31/20
[52] U.S. Cl. ...................... 428/408; 428/327; 428/413; 428/423.1; 428/297.4; 156/230; 156/238; 156/307.3; 156/307.7
[58] Field of Search ..................... 428/212, 408, 428/413, 327, 423.1, 423.5, 423.7, 297.4, 299.1; 442/179, 334, 392; 156/230, 238, 307.3, 307.7, 308.2, 309.6

[56] References Cited

U.S. PATENT DOCUMENTS

| | | | |
|---|---|---|---|
| 5,061,533 | 10/1991 | Gomi et al. | 428/36.3 |
| 5,236,018 | 8/1993 | Kobayashi et al. | 138/172 |
| 5,902,755 | 5/1999 | Driggett et al. | 442/179 |
| 5,910,456 | 6/1999 | Matsuhisa et al. | 442/179 |
| 5,985,431 | 11/1999 | Oosedo et al. | 428/297.4 |

FOREIGN PATENT DOCUMENTS

| | | |
|---|---|---|
| 55-80531 | 6/1980 | Japan . |
| 1-104624 | 4/1989 | Japan . |
| 2-227212 | 9/1990 | Japan . |
| 7-118414 | 5/1995 | Japan . |

*Primary Examiner*—Timothy M. Speer
*Assistant Examiner*—Bryant Young
*Attorney, Agent, or Firm*—Austin R. Miller

[57] ABSTRACT

The present invention relates to a carbon fiber prepreg. The carbon fiber prepreg of the present invention is characterized in that a carbon fiber bundle comprising a plurality of continuous carbon filaments and having a hook drop value of 10 cm or more as the degree of fiber entanglement is impregnated with a base resin mainly composed of a thermosetting resin, and that particles of 150 $\mu$m or less in particle size made of a thermoplastic resin account for 20 wt % or less based on the weight of the entire prepreg and distributed at a higher concentration in the surface zone than in the inside. The carbon fiber prepreg of the present invention is good in tackiness and less changing in tackiness with the lapse of time, and can form a composite with an excellent compression interlaminar shear strength (CILS) at high temperature after moisture absorption while maintaining good impact resistance. It also allows the production of a composite very higher than the conventional composite in the compressive strength (LCS) of a cross laminated panel. The carbon fiber prepreg of the present invention can be preferably used as a structural member in such areas as aerospace area, sporting area and civil engineering and architecture area.

13 Claims, No Drawings

CARBON FIBER PREPREG, AND A PRODUCTION PROCESS THEREOF

TECHNICAL FIELD

The present invention relates to a carbon fiber prepreg and a production process thereof. In more detail, it relates to a carbon fiber prepreg obtained by impregnating a carbon fiber bundle comprising a plurality of continuous filaments and with a specific degree of fiber entanglement, with a base resin mainly composed of a thermosetting resin, characterized in that the thermoplastic resin exists as particles with a specific particle size by a specific quantity in a specific positional distribution, and also to a production process thereof.

A fabricated product (fiber reinforced composite) (hereinafter simply called a composite) obtained by laminating, heating and pressing a plurality of sheets of the carbon fiber prepreg of the present invention is excellent in impact resistance and has an especially high compressive strength as a cross laminated panel.

BACKGROUND ARTS

Composites with a thermosetting resin as the matrix are widely used in various areas such as aerospace area, sporting area, civil engineering and architecture area since they are light in weight and excellent in mechanical properties, corrosion resistance, etc. So far, various prepregs as combinations of a thermosetting resin and reinforcing fibers, and composites made from them are known. Above all, prepregs made from an epoxy resin and carbon fibers are excellent in specific strength and specific elastic modulus, and the composites fabricated from them are excellent in such properties as heat resistance and compressive strength.

A prepreg is obtained by impregnating reinforcing fibers such as carbon fibers with a matrix resin such as an epoxy resin, and can be produced by any of various methods. A prepreg is typically produced by preparing a resin coated film with a matrix resin laminated on a releasable film such as paper and a reinforcing fiber sheet with reinforcing fibers such as carbon fibers arranged like a sheet, and overlaying the resin coated film on one or both sides of the reinforcing fiber sheet, with the resin side kept inside, and heating and pressing them, to impregnate the reinforcing fibers with the resin.

In general, a composite with a thermosetting resin as the matrix resin is brittle and weak in impact.

Depending on applications, a prepreg with higher impact resistance is necessary. For example, Japanese Patent Laid-Open (Kokai) No. 1-104624 discloses an interlaminar particle reinforced prepreg with thermoplastic resin particles as a surface layer, to ensure that when a plurality of layers of the prepreg are laminated, particles made of a highly tough thermoplastic resin are localized between laminate layers.

However, the prepreg produced according to this technique is limited in applicability to an area requiring a compression interlaminar shear strength, since it declines in compression interlaminar shear strength (CILS), though highly improved in impact resistance. Furthermore, an interlaminar particle reinforced prepreg has a disadvantage that the tackiness described later is generally low, compared to a prepreg without containing particles.

DISCLOSURE OF THE INVENTION

An object of the present invention is to solve the problem of the above prior arts by providing a prepreg good in tackiness and less changing in trackiness with the lapse of time.

Another object of the present invention is to provide a prepreg which allows the formation of a composite excellent in CILS at high temperature after moisture absorption while keeping good impact resistance.

A further other object of the present invention is to provide a prepreg which allows the production of a composite very higher than the conventional composite in the laminate compressive strength (LCS) of a cross laminated panel produced as a composite by laminating, heating and pressing a plurality of layers of the prepreg.

A still further other object of the present invention is to provide a process for producing the prepreg.

The present invention is as described below.

(A) Carbon Fiber Prepreg of the Present Invention:

(A1) A carbon fiber prepreg, characterized in that a carbon fiber bundle comprising a plurality of continuous carbon filaments and having a hook drop value of 10 cm or more as the degree of fiber entanglement is impregnated with a base resin mainly composed of a thermosetting resin, and that particles of 150 µm or less in particle size made of a thermoplastic resin account for 20 wt % or less based on the weight of the entire prepreg and distributed at a higher concentration in the surface zone than in the inside.

In the above general production methods of prepregs, cases of using a resin coated film have been described, but in the present invention, the prepreg referred to in the mixing ratio of the particles made of a thermoplastic resin to the prepreg means a prepreg free from the releasable film used in the production.

(A2) A carbon fiber prepreg, according to said (A1), wherein the tensile strength of the carbon fiber bundle is 4,400 MPa or more.

(A3) A carbon fiber prepreg, according to said (A2), wherein the tensile strength of the carbon fiber bundle is 5,000 MPa or more; the elastic modulus is 270 GPa or more; and the density is 1.76 g/cm$^3$ or less.

(A4) A carbon fiber prepreg, according to any one of said (A1) through (A3), wherein the carbon filaments are substantially circular in cross sectional form.

(B) Process for Producing the Carbon Fiber Prepreg of the Present Invention:

(B1) A process for producing a carbon fiber prepreg, comprising the steps of (a) preparing a sheet formed by a carbon fiber bundle comprising a plurality of continuous carbon filaments and having a hook drop value of 10 cm or more as the degree of fiber entanglement, (b) preparing a resin coated film in which a releasable film is coated with a matrix resin obtained by mixing a base resin mainly composed of a thermosetting resin and particles with a particle size of 150 µm or less made of a thermoplastic resin in an amount corresponding to 20 wt % or less of the prepreg to be completed, (c) forming a laminated sheet in which the resin coated film is overlaid on the sheet formed by the carbon fiber bundle, in such a manner that the matrix resin contacts the surface of the sheet formed by the carbon fiber bundle, and (d) forming a formed resin impregnated product, in which the clearances between a plurality of carbon filaments of the carbon fiber bundle are impregnated with the base resin, by heating and pressing the laminated sheet.

(B2) A process for producing a carbon fiber prepreg comprising the steps of (a) preparing a sheet formed by a carbon fiber bundle comprising a plurality of continuous carbon filaments and having a hook drop value of 10 cm or more as the degree of fiber entanglement, (b) preparing a first resin coated film in which a first releasable film is coated with a base resin mainly composed of a thermosetting resin, (c) forming a first laminated sheet in which the first resin coated film is overlaid on the sheet formed by the carbon fiber bundle, in such a manner that the base resin contacts the surface of the sheet formed by the carbon fiber bundle, (d) forming a first formed resin impregnated product, in which the clearances between a plurality of carbon filaments of the carbon fiber bundle are impregnated with the base resin, by heating and pressing the laminated sheet, (e) preparing a second resin coated film in which a second releasable film is coated with a matrix resin obtained by mixing a base resin mainly composed of a thermosetting resin and particles with a particle size of 150 $\mu$m or less made of a thermoplastic resin in an amount corresponding to 20 wt % or less of the prepreg to be completed, (f) forming a second laminated sheet in which the second resin coated film is overlaid on the first formed resin impregnated product, in such a manner that the matrix resin of the second resin coated film contacts the surface of the first formed resin impregnated product, and (g) heating and pressing the second laminated sheet, for forming the second formed resin impregnated product where the matrix resin and the base resin are integrated.

THE BEST EMBODIMENTS OF THE INVENTION

The above is the gist of the carbon fiber prepreg and the production process thereof of the present invention. The present invention is described below in more detail.

The carbon fiber prepreg of the present invention comprises three major components as described above.

In the following description, these components are called as follows. The carbon fiber bundle comprising a plurality of continuous carbon filaments and having a hook drop value of 10 cm or more as the degree of fiber entanglement is called the component [P1]; the base resin mainly composed of a thermosetting resin is called the component [P2]; and the particles with a particle size of 150 $\mu$m or less made of a thermoplastic resin is called the component [P3].

The portion comprising both the components [P2] and [P3] is called the matrix resin, and the component [P2] only is called the base resin, for distinction.

Component [P2] (base resin mainly composed of a thermosetting resin):

The thermosetting resins which can be used here include epoxy resins, unsaturated polyester resins, vinyl ester resins, phenolic resins, urethane resins, urea resins, melamine resins, maleimide resins, cyanate resins, alkyd resins, addition setting polyimide resins, etc. Among them, epoxy resins can be preferably used since they can provide composites excellent in heat resistance and mechanical properties.

The epoxy resins which can be used here include, though not limited to, bisphenol A type epoxy resins, bisphenol F type epoxy resins, bisphenol B type epoxy resins, bisphenol S type epoxy resins, naphthalene type epoxy resins, novolak type epoxy resins, epoxy resins with fluorene skeleton, epoxy resins produced from any copolymer consisting of a phenol compound and dicyclopentadiene, glycidyl ether type epoxy resins such as diglycidyl resorcinol, tetrakis (glycidyloxyphenyl)ethane and tris(glycidyloxyphenyl) methane, and their mixtures.

A preferable epoxy resin is a mixture consisting of a bifunctional or higher functional glycidylamine type epoxy resin and a bisphenol F type epoxy resin.

It is also preferable to use a mixture with a thermoplastic resin dissolved in any of said thermosetting resins. The thermoplastic resins which can be preferably used here include those with bonds in the main chain, selected from carbon carbon bonds, amide bonds, imide bonds, ester bonds, ether bonds, carbonate bonds, urethane bonds, urea bonds, thioether bonds, sulfone bonds, imidazole bonds and carbonyl bonds.

It is especially preferable that one or more resins selected from polysulfones, polyether sulfones, polyether imides and polyimides are mixed and dissolved in the component [P2].

These thermoplastic resins can be those marketed and also oligomers lower than those marketed in molecular weight. It is preferable that the oligomer used has functional groups capable of reacting with the thermosetting resin at the ends or in the molecular chains.

A mixture consisting of a thermosetting resin and a thermoplastic resin gives better results than a thermosetting resin only. The reasons are that the brittleness of the thermosetting resin is compensated by the toughness of the thermoplastic resin, and that the low formability of the thermoplastic resin is compensated by the thermosetting resin, to provide a well balanced component [P2].

The curing agents which can be used here include, though not limited to, aromatic amines such as diaminodiphenylmethane and diaminodiphenylsulfone, aliphatic amines, imidazole derivatives, dicyanediamide, tetramethylguanidine, thiourea added amines, methylhexahydrophthalic anhydride, carboxylic amides, polyphenol compounds, novolak resins, polymercaptone, Lewis acid complexes such as boron trifluoride ethylamine complex.

As the curing agent for the epoxy resin used as the component [p2], diaminodiphenylsulfone is preferable.

Any of these curing agents can be used in combination with a proper curing catalyst, for improving the curing activity. It is preferable, for example, to use 3-(3-,4-dichlorophenyl)-1,1-dimethylurea (DCMU) as a curing catalyst in combination with dicyanediamide or to use a tertiary amine as a curing catalyst in combination with a carboxylic anhydride or novolak resin.

Component [P3] (particles with a particle size of 150 $\mu$m or less made of a thermoplastic resin).

The particles can be those with a particle size of 150 $\mu$m or less made of one or more resins selected from a group consisting of polyvinyl acetate, polyamides, polycarbonates, polyacetal, polyphenylene oxide, polyphenylene sulfide, polyallylates, polyesters, polyamidimides, polyimides, polyether imides, polysulfones, polyether sulfones, polyether ether ketones, polyaramid, polybenzoimidazole, polyethylene polypropylene, cellulose acetate and cellulose butyrate.

Preferable particles are those with a particle size of 60 $\mu$m or less made of one or more resins selected from a group consisting of polyamides, polyallylates, polyamidimides, polyimides, polyether imides, polysulfones, polyether sulfones and polyaramid.

Especially preferable resins to form the particles are polyamides. Among them, a polyamide mainly composed of nylon 12 is especially excellent in impact resistance. Concretely, "SP-500" produced by Toray Industries, Inc. can be used.

As the resin of the component [P3], it is preferable to select a resin with an elastic modulus lower than that of the cured product of the component [P2], for obtaining high LCS. It is especially preferable that the elastic modulus in flexure of the resin of the component [P3] is ⅔ or less of the elastic modulus in flexure of the cured product of the component [P2]. More preferable is ½ or less.

Particles which have an inter-penetrating polymer network or can have an inter-penetrating polymer network by combining a polyamide resin and an epoxy resin as disclosed in Japanese Patent Laid-Open (Kokai) No. 1-104624 are further more preferable since they are excellent in both heat resistance and solvent resistance. Concretely "Toraypearl" (registered trade name) "TN" produced by Toray Industries, Inc. can be used.

Particles of one resin can be used, but those obtained by mixing two or more resins can also be used.

The particle size means the volume average particle size obtained by the centrifugal sedimentation rate method, etc. It is only required that the particle size is not so large as to disturb the arrangement of the reinforcing fibers in a fabricated composite.

If the particle size is larger than 150 μm, the particles disturb the arrangement of the reinforcing fibers and make the interlaminar thickness of the obtained composite thicker than necessary, to lower the physical properties. So, the particle size must be 150 μm or less.

If the particle size is less than 1 μm, the particles stray into the clearances between the filaments of the reinforcing fiber bundle, and when layers of the prepreg are laminated, the particles are not localized in the interlaminar portions. As a result, the effect of particles cannot be sufficiently obtained, and impact resistance declines. So, it is preferable that the particle size is 1 μm or more.

A more preferable particle size range is 3 to 60 μm, and a further more preferable range is 5 to 30 μm.

As for the external form, surfaces and internal style of particles, they can be spherical, non-spherical or porous.

Spherical particles are preferable since the flowability of the resin does not decline, but since the use of thermoplastic resin particles with a specific particle size is intended to localize the particles in the interlaminar regions of the laminate, for inhibiting the propagation of delamination under impact, the particles are not especially limited in form or style.

It is essentially required that the particles are distributed at a higher concentration in the surface of one side or the surfaces of both sides of the prepreg than in the inside. The distribution of particles at a higher concentration in the surfaces than in the inside means that 90% or more of the particles are localized within 30% thicknesses of the prepreg from the surfaces of the prepreg.

The localization degree of particles in a prepreg can be estimated according to the following method, as disclosed in Japanese Patent Laid-Open (Kokai) No. 1-104624.

At first, a prepreg is kept in contact between two smooth support plates and cured by gradually raising the temperature, taking a long time. What should be kept in mind in this case is to gel at a temperature as low as possible. If the temperature is raised before gelation, the resin in the prepreg flows, causing the particles to migrate, and the accurate particle distribution in the prepreg cannot be estimated. After gelation, a further time is taken to gradually raise the temperature, for curing the prepreg.

Then, the cured prepreg is cut in the normal direction, and a photo with a size of 200 mm×200 mm or more obtained by expanding the section to 200 times or more is taken. The sectional photo is used to obtain the average prepreg thickness. For the average thickness of one prepreg layer, the thickness is measured at least at 5 points selected optionally on the photo, and the values are averaged. Subsequently, lines are drawn in parallel to both the surfaces of the prepreg at 30% positions of the thickness of the prepreg from the surfaces in contact with both the support plates. The sectional area of the particles existing between the 30% parallel lines and the surfaces of the prepreg in contact with the support plates is determined, and the sectional area of the particles existing in the entire thickness of the prepreg is determined. Their ratio is taken to calculate the amount of particles existing within 30% thicknesses of the prepreg from the surfaces of the prepreg.

The sectional area of particles can be determined by using an image analyzer or cutting out and weighing all the particle portions existing in the predetermined area from the sectional photo. To eliminate the influence of partial irregularity in the distribution of particles, this determination is effected in the entire width of the obtained photo, and similar determination is effected on optionally selected five or more photos, to average the results.

When it is difficult to distinguish the particles from the matrix resin, either the particles or the matrix resin is dyed selectively for observation. The microscope used can be either an optical microscope or a scanning electron microscope, and either can be selectively used depending on the particle size and dyeing method.

The quantity of the particles must be 20 wt % or less based on the weight of the prepreg. If the quantity of the particles exceeds 20 wt % based on the weight of the prepreg, it is difficult to mix the particles with the base resin, and the tackiness and drapability of the prepreg decline. To give the impact resistance of the particles while maintaining the properties of the base resin, the quantity of the particles must be 20 wt % or less based on the weight of the prepreg. Preferable is 15 wt % or less. To make the prepreg handling convenience more excellent, it is preferable that the quantity of the particles is 10 wt % or less. On the contrary, it is preferable that the quantity of the particles is 1 wt % or more based on the weight of the prepreg, since high impact resistance and high compressive strength of a cross laminated panel can be obtained.

The particle content of the prepreg is estimated as described below. At first, a solvent which dissolves the matrix resin but does not dissolve the particles is selected. The solvent is supplied into a beaker, and the prepreg with its weight measured is immersed in it. The resin is dissolved using an ultrasonic washer, and the reinforcing fibers are picked up by forceps. The remaining solution is filtered by a membrane filter with its weight measured beforehand. The particles remain on the filter, and the dissolved resin passes through the filter together with the solvent. The reinforcing fibers picked up by forceps are returned into the original beaker. In the beaker, the reinforcing fibers are washed by the solvent, and the washing is filtered by a filter. These operations are repeated several times. The washed reinforcing fibers are taken out, and the inner wall of the beaker is washed by the solvent several times not to leave any particles in the beaker. The washing is filtered. The filter with the particles on it are folded in quarter and dried in an oven, then being weighed. From the measured weight, the original filter weight is subtracted, to obtain the weight of particles. From the ratio to the original prepreg weight, the particle content can be calculated.

The particles as the component [P3] can remain to keep their form or be deformed after forming and curing the composite. Furthermore, after forming the composite, they can lose their form perfectly, for example, by being dissolved into the component [B] and causing phase separation.

The conventional interlaminar particle reinforced prepreg has a disadvantage that CILS declines, though very high in impact resistance. Especially the decline of CILS at high temperature after moisture absorption is remarkable.

The CILS can be estimated according to the method stated in Boeing Material Specification 8-276.

The CILS at high temperature after moisture absorption is obtained by immersing a test piece worked to have a specified size into hot water of 71±5° C. (160±10 F) for 2 weeks, taking it out and measuring in an atmosphere of 82.2±5° C. (180±10 F).

The impact resistance can be expressed by CAI (compression strength after impact) and measured according to the method stated in Boeing Material Specification 8-276.

To obtain a prepreg with good tackiness and less changing in tackiness with the lapse of time, and to obtain a laminated sheet higher in impact resistance and CILS and also to obtain a cross laminated panel with a higher compressive strength (LCS), it is effective to use a carbon fiber bundle substantially free from twisting and distortion as the component [P1] together with the component [P3].

To improve impact resistance, the existence of the particles as the component [P3] is absolutely necessary, but according to the conventional technique of simply adding the component [P3], CILS declines and the tackiness of the prepreg declines.

On the contrary, it has been found that if a carbon fiber bundle substantially free from twisting and distortion is used together with the component [P3], CILS is improved without impairing impact resistance, and that the tackiness of the prepreg improves, and furthermore that surprisingly LCS also improves.

Component [P1] (carbon fiber bundle with a hook drop value of 10 cm or more):

As the carbon fiber bundle, it is preferable that the cross sectional form of the carbon filaments constituting the carbon fiber bundle is substantially circular. The twisting and distortion of the carbon fiber bundle can be quantitatively expressed by the hook drop value.

The hook drop value is measured according to the following procedure. The carbon fiber bundle is allowed to stand in an atmosphere of 23±2° C. and 50±5% humidity for 2 hours. The carbon fiber bundle is cut at a length of 1.5 m, and a load of 100 g is attached at the bottom, to vertically suspend the fiber bundle. On the other hand, a 1 mm dia. 100 mm long stainless steel wire is bent at a bottom 20 to 30 mm portion, and a load is attached there to have a total weight of 12 g, while a top 20 to 30 mm portion is bent like a U-letter, to prepare a hook with a specified load. The U-shaped portion at the top of the hook is hooked at the center in the crosswise direction of the suspended fiber bundle, and is allowed to drop. Thirty minutes later, the drop distance (unit: cm) of the hook is measured as the hook drop value. This measurement is effected at least 5 times, and the values are averaged. If the fiber bundle has twisting and distortion, this value becomes small.

In general, a carbon fiber bundle is kept integral to prevent such troubles as winding seizure of broken filaments around rollers in the carbon fiber bundle production process and to improve process passability by controlling the spread of the carbon fiber bundle in the carbon fiber bundle supply creel, guides and comb in the prepreg production process.

The carbon fiber bundle is kept integral by entangling or twisting or sizing the plurality of filaments constituting the fiber bundle. If the filaments are twisted, they must be untwisted after passing through the process.

However, though the carbon fiber bundle kept integral is better in process passability, the bundle integrity lowers the matrix resin impregnability in the production of the prepreg.

Furthermore, if the filaments twisted are untwisted, the carbon fiber bundle remains twisted and distorted, and the prepreg produced is less smooth and uneven on the surface, to adversely affect the physical properties as a composite. A bundle integrity indicator is the hook drop value.

If the hook drop value is larger, resin impreganability and surface smoothness improve in the production of the prepreg, but the carbon fiber bundle spreads too much in the carbon fiber bundle supply creel, guides and comb, being liable to cause such troubles as fuzzing and process passing failure.

In this regard, it is preferable that the hook drop value of the carbon fiber bundle is 10 cm to 100 cm. A more preferable range is 12 cm to 100 cm.

It has been found that if carbon fibers substantially free from twisting and distortion are used in combination with a matrix resin, the CILS at high temperature after moisture absorption improves.

It is considered that since the prepreg formed by using a carbon fiber bundle with a hook drop value of 10 cm or more is good in surface smoothness, to keep the interlaminar thickness after lamination and curing uniformly and stably formed, defects are decreased to improve the CILS.

The conventional prepreg containing particles at a high concentration in the surfaces has a problem that it is very week in tackiness compared to the prepreg obtained by using the same base resin without said particles. If the tackiness declines, the adjacent layers of the prepreg laminated shift from each other, not allowing a desired laminated sheet to be obtained.

However, it has been found that if a carbon fiber bundle with a hook drop value of 10 cm or more is used, the tackiness improves compared to the conventional prepreg of a particle-containing resin. It is considered that the good surface smoothness of the prepreg contributes to the improvement of tackiness. It has also been found that the change of tackiness with the lapse of time becomes also small. It is considered that compared to the conventional prepreg, the carbon fiber bundle moves less while it is allowed to stand at room temperature, and as a result, that the resin is less likely to sink for assuring the resin to remain on the surface of the prepreg. It is considered that the resin secured in the surface is attributable to the component [P1] less twisted and distorted, i.e., to a hook drop value of 10 cm or more, or to the smaller stress acting inside and also to the viscosity increase of the resin by the component [P3].

The tackiness in this case is an indicator of prepreg surface tackiness, and is generally measured by a tackiness tester in an environment of 21.7±1.7° C. (71±3 F) and 50±5% humidity. Specifically, the tackiness is evaluated by contact-bonding a 18×18 mm cover glass to a prepreg at a force of 4 kgf for 5 seconds using "PICMA Tackiness Tester II" produced by K.K. Toyo Seild Seisakusho, and pulling at a speed of 30 mm/min, to measure the resistance force for peeling it.

Furthermore, the compressive strength of a cross laminated panel as a composite fabricated from the prepreg of the present invention is very large compared to the value expected from the conventional prepreg.

In general, the compressive strength of a cross laminated panel as a composite can be predicted by calculation according to the laminate theory from the compressive strength of a unidirectional laminated panel of the same prepreg. In the prior arts, if prepregs are equivalent in the strength as a unidirectional laminated panel, they are almost equivalent in the strength as a cross laminated panel.

On the contrary, in the case of the prepreg of the present invention, it has been found that even if the prepreg is equivalent in the compressive strength as a unidirectional laminated sheet compared to the conventional particle-containing prepreg, the compressive strength (LCS) as a cross laminated panel is remarkably high.

In a compression test of a cross laminated panel, it often occurs that before the entire breaking occurs, a crossing layer (e.g., ±45° layer or 90° layer) outside a 0° layer (a layer with continuous fibers arranged as a reinforcing material in the loading direction) of a test piece peels partially.

Compared to the conventional particle-containing prepreg, unexpectedly, the cross laminated panel fabricated from the prepreg of the present invention does not have the crossing layer peeled before the entire breaking, or causes the peeling later. As a result, it can bear a larger load before the entire breaking occurs, showing a higher strength.

It is considered that this effect is attributable both to the uniformity of the interlaminar thickness due to the component [P1] less twisted and distorted and to the increase of peel resistance due to the existence of the component [P3].

The LCS is evaluated using a non-perforated panel according to the measuring method stated in Boeing Specification Support Standard BSS7260 for perforated panel compressive strength. The test piece size is 304.8 mm long (loading direction)×38.1 mm wide, and the compressive strength is obtained without any reinforcing tab on the lateral side of the test piece.

It is preferable that the plurality of carbon filaments constituting the carbon fiber bundle used in the present invention are substantially circular in cross sectional form. The reason is that when the resin is impregnated, the filaments are likely to be rearranged, to allow easy penetration of the resin into the clearances between the carbon filaments.

The carbon filaments substantially circular in cross sectional form refer to those with a deformation degree of 1.1 or less. The deformation degree in this case is defined as the ratio (R/r) of the radius R of the circumscribed circle of the section of each filament to the radius r of the inscribed circle.

It is preferable that the carbon fiber bundle used has a tensile strength of 4400 MPa or more and an elastic modulus of 270 GPa or more, since a cured board with a high tensile strength can be produced while the standard elastic modulus considered in a composite is secured. It is preferable that the carbon fiber bundle used has a tensile strength of 5000 MPa or more, an elastic modulus of 270 GPa or more and a density of 1.76 g/cm$^3$ or less, since the cured board produced is higher in strength, higher in elastic modulus and lower in specific gravity.

The carbon fiber bundle used in the present invention is a bundle of a plurality of continuous carbon filaments. Unless the filaments are continuous, the composite produced from the prepreg cannot sufficiently manifest the strength of the reinforcing fibers. The carbon fiber bundle is not especially limited in form or arrangement, and can be, for example, unidirectional or random directional and can also be a sheet, mat, woven fabric or braids. Especially for an application requiring a high specific strength and a high specific elastic modulus, it is most suitable for the present invention that the carbon fiber bundle is paralleled in one direction, but a woven fabric convenient to handle is also suitable for the present invention.

As the carbon fiber bundle used in the present invention, it is preferable that a plurality of filaments are paralleled in one direction as yarns, tows or strands. The prepregs of the present invention formed from these carbon fiber bundles are called yarn prepreg, tow prepreg and strand prepreg respectively in view of fiber form.

The prepreg of the present invention can be produced by any of several methods.

The so-called hot melt method can be used. According to this method, a resin coated film in which a film such as releasing paper is coated with a base resin or matrix resin is used to impregnate a carbon fiber bundle sheet on one side or both sides with the resin formed on the resin coated film, in the clearances between the carbon filaments of the carbon fiber bundle, for producing a prepreg. There is also the so-called wet method, in which a paralleled carbon fiber bundle is immersed in a resin dissolved in a solvent, and dried to produce a prepreg.

As a further other method, to let more particles exist in the surface layer of the prepreg, a matrix resin film containing particles can be stuck on one or both sides of a prepreg produced according to an ordinary method.

As a still further other method, particles can also be scattered on one or both sides of a prepreg produced without containing particles.

EXAMPLES

The present invention is described below in reference to examples. In the following examples, the following carbon fiber bundles were used:
(I) "Torayca" (registered trade name) T800H-12K-40B (produced by Toray Industries, Inc.)

Tensile strength: 5,490 MPa (560 kgf/mm$^2$)

Elastic modulus in tension: 294 GPa (30.0×10$^3$ kgf/mm$^2$)

Fineness: 0.445 g/m

Density: 1.81 g/cm$^3$

Hook drop value: 8.2 cm

Deformation degree (R/r): 1.37
(II) "Torayca" (registered trade name) M30G-18K-11E (produced by Toray Industries, Inc.)

Tensile strength: 5,490 MPa (560 kgf/mm$^2$)

Elastic modulus in tension: 294 GPa (30.0×10$^3$ kgf/mm$^2$)

Fineness: 0.745 g/m

Density: 1.73 g/cm$^3$

Hook drop value: 14.1 cm

Deformation degree (R/r): 1.04
(III) "Torayca" (registered trade name) T700S-12K-50C (produced by Toray Industries, Inc.)

Tensile strength: 4,900 MPa (500 kgf/mm$^2$)

Elastic modulus in tension: 230 GPa (23.5×10$^3$ kgf/mm$^2$)

Fineness: 0.800 g/m

Density: 1.80 g/cm$^3$

Hook drop value: 17.1 cm

Deformation degree (R/r): 1.05

The tensile strength and elastic modulus in tension of each carbon fiber bundle was measured according to JIS R 7601.

Example 1

In a kneader, 12.6 parts by weight of polyether sulfone (PES) were dissolved into 10 parts by weight of a bisphenol F type epoxy resin (Epicron (registered trade name) 830 produced by Dainippon Ink & Chemicals, Inc.), 30 parts by weight of a bisphenol A type epoxy resin (Epikote (registered trade name) 825 produced by Yuka Shell K.K.) and 60 parts by weight of tetraglycidyldiaminodiphenylmethane (TGDDM) (ELM-434 produced by Sumitomo Chemical Co., Ltd.), and 21.6 parts by weight of fine polyamide particles (Toraypearl TN produced by Toray Industries, Inc., average particle size 12.5 $\mu$) were kneaded with the solution. Furthermore, 45 parts by weight of 4,4'-diaminodiphenylsulfone (4,4'-DDS) as a curing agent were kneaded, to produce a matrix resin. Releasing paper was coated with the matrix resin by 52 g/m$^2$ in areal unit weight, to produce resin coated paper. Between two sheets of the resin coated paper with the resin sides kept inside, a carbon fiber bundle "Torayca" M30G-18K-011E was arranged, and they were pressed by heating press rolls, to impregnate the carbon fiber bundle with the resin, for preparing a unidirectional prepreg. The prepreg had a carbon fiber areal unit weight of 190 g/m$^2$, a prepreg areal unit weight of 294 g/m$^2$ and a matrix resin content of 35.4%. The tackiness of the prepreg was "Good" as shown in Table 1, and little changed with the lapse of time when allowed to stand at room temperature.

The prepared unidirectional prepreg was cut at a predetermined size into sheets which were then laminated. The lamination structures were $(O)_{12}$ for CILS, $(45/90/-45/0)_{3S}$ for CAI and $(45/90/-45/0)_{2S}$ for LCS. Each of the laminates was placed on an aluminum tool sheet with a releasing film laid on it, and furthermore sealed by a releasing film and a bagging film, and the sealed atmosphere was evacuated through a nozzle. The set was put in an autoclave and treated at a pressure of 6 kg/cm$^2$ and 180° C. for 120 minutes, to prepare a cured panel. The CILS of the cured panel in an atmosphere of 82.2±5° C. after moist☐☐e absorption was as high as 50.3 MPa (7.3 ksi), and CAI was 241 MPa (35 ksi) while LCS was 579 MPa (84 ksi).

Example 2

A prepreg and cured panel were prepared as described in Example 1, except that "Torayca" T700S-12K-50C was used as the carbon fiber bundle.

The tackiness of the prepreg was "Good". The CILS of the cured panel in an atmosphere of 82.2±5° C. after moisture absorption was as high as 58.6 MPa (8.5 ksi), and CAI was 276 MPa (40 ksi) while LCS was 593 MPa (86 ksi).

Example 3

In a kneader, 12.6 parts by weight of PES were dissolved into 10 parts by weight of a bisphenol F type epoxy resin (Epicron 830 produced by Dainippon Ink & Chemicals, Inc.), 30 parts by weight of a bisphenol A type epoxy resin (Epikote 825 produced by Yuka Shell K.K.) and 60 parts by weight of tetraglycidyldiaminodiphenylmethane (TGDDM: ELM-434 produced by Sumitomo Chemical Co., Ltd.), and 45 parts by weight of 4,4'-DDS as a curing agent were kneaded, to prepare a matrix resin. The matrix resin was used as a primary resin.

In a kneader, 12.6 parts by weight of PES were dissolved into 10 parts by weight of a bisphenol F type epoxy resin (Epicron 830 produced by Dainippon Ink & Chemicals, Inc.), 30 parts by weight of a bisphenol A type epoxy resin (Epikote 825 produced by Yuka Shell K.K.) and 60 parts by weight of tetraglycidyldiaminodiphenylmethane (TGDDM: ELM-434 produced by Sumitomo Chemical Co., Ltd.), and 75.5 parts by weight of fine polyamide particles (Toraypearl TN produced by Toray Industries, Inc., average particle size 12.5 $\mu$) were kneaded with the solution. Furthermore, 45 parts by weight of 4,4'-DDS as a curing agent were kneaded, to prepare a matrix resin. The matrix resin was used as a secondary resin.

Releasing paper was coated with the primary resin by 31.5 g/m$^2$ in areal unit weight, to prepare resin coated paper. Between two sheets of the resin coated paper with resin sides kept inside, a carbon fiber bundle "Torayca" M30G-18K-11E was arranged, and they were pressed by heating press rolls, to impregnate the carbon fiber bundle with the resin, for preparing a primary unidirectional prepreg. The primary prepreg had a carbon fiber areal unit weight of 190 g/m$^2$, a prepreg areal unit weight of 253 g/m$^2$ and a matrix resin content of 24.9%.

Releasing paper was coated with the secondary resin by 20.5 g/m$^2$ in areal unit weight, to prepare resin coated paper. Between two sheets of the resin coated paper with the resin sides kept inside, the primary prepreg was arranged, and they were pressed by heating press rolls as described for preparing the primary prepreg, to prepare a secondary prepreg. The prepreg had a carbon fiber areal unit weight of 190 g/m$^2$, a prepreg areal unit weight of 294 g/m$^2$ and a matrix resin content of 35.4%. The tackiness of the prepreg was "Very good".

The prepared prepreg was processed as described in Example 1, to prepare cured panels. The CILS of the cured panel in an atmosphere of 82.2±5° C. after moisture absorption was 52.4 MPa (7.6 ksi), and CAI was 215 MPa (36 ksi) while LSC was 572 MPa (83 ksi).

Example 4

A prepreg and cured panels were prepared as described in Example 3, except that "Torayca" T700S-12K-50C was used as the carbon fiber bundle.

The tackiness of the prepreg was "Very good". The CILS of the cured panel in an atmosphere of 82.2±5° C. after moisture absorption was 53.8 MPa (7.8 ksi), and CAI was 297 MPa (43 ksi) while LCS was 586 MPa (85 ksi).

Example 5

A prepreg and cured panels were prepared as described in Example 3, except that SP-500 (average particle size 5 $\mu$) was used as the fine polyamide particles.

The tackiness of the prepreg was "Very good". The CILS of the cured panel in an atmosphere of 82.2±5° C. after moisture absorption was 34.5 MPa (5.0 ksi), and CAI was 255 MPa (37 ksi) while LCS was 593 MPa (86 ksi).

Example 6

A prepreg and cured panels were prepared as described in Example 5, except that "Torayca" T700S-12K-50C was used as the carbon fiber bundle.

The tackiness of the prepreg was "Very good". The CILS of the cured panel in an atmosphere of 82.2±5° C. after moisture absorption was 44.1 MPa (6.4 ksi), and CAI was 262 MPa (38 ksi) while LCS was 614 MPa (89 ksi).

Example 7

In a kneader, 12.7 parts by weight of polyether sulfone (PES) was dissolved into 10 parts by weight of a bisphenol F type epoxy resin (Epicron 830 produced by Dainippon Ink & Chemicals, Inc.) and 90 parts by weight of tetraglycidyldiaminodiphenylmethane (TGDDM: ELM-434 produced by Sumitomo Chemical Co., Ltd.), and 32.5 parts by weight of 3,3'-diaminodiphenylsulfone (3,3'-DDS) as a curing agent were kneaded with the solution, to prepare a matrix resin. The matrix resin was used as a primary resin.

In a kneader, 4.3 parts by weight of polyether sulfone (PES) were dissolved into 10 parts by weight of a bisphenol F type epoxy resin (Epicron 830 produced by Dainippon Ink & Chemicals, Inc.) and 90 parts by weight of tetraglycidyl-diaminodiphenylmethane (TGDDM: ELM-434 produced by Sumitomo Chemical Co., Ltd.), and 19.9 parts by weight of fine polyamide particles (SP-500 produced by Toray Industries, Inc., average particle size 5 μ) were kneaded with the solution. Furthermore, 32.5 parts by weight of 3,3'-DDS as a curing agent were kneaded, to prepare a matrix resin. The matrix resin was used as a secondary resin.

Releasing paper was coated with the primary resin by 31.5 g/m² in areal unit weight, to prepare resin coated paper. Between two sheets of the resin coated paper with the resin sides kept inside, a carbon fiber bundle, "Torayca" T700S-12K-50C was arranged, and they were pressed by heating press rollers, to impregnate the carbon fiber bundle with the resin, for preparing a primary unidirectional prepreg. The primary prepreg had a carbon fiber areal unit weight of 190 g/m², a prepreg areal unit weight of 253 g/m² and a matrix resin content of 24.9%.

Then, releasing paper was coated with the secondary resin by 20.5 g/m² in areal unit weight, to prepare resin coated paper. Between two sheets of the resin coated paper with the resin sides kept inside, the primary prepreg was arranged, and they were pressed by heating press rolls as described for preparing the primary prepreg, to prepare a secondary prepreg. The prepreg had a carbon fiber areal unit weight of 190 g/m², a prepreg areal unit weight of 294 g/m² and a matrix resin content of 35.4%. The tackiness of the prepreg was "Very good".

The prepared prepreg was processed as described in Example 1, to prepare cured panels. The CILS of the cured panel in an atmosphere of 82.2±5° C. after moisture absorption was 42.1 MPa (6.1 ksi), and CAI was 276 MPa (40 ksi) while LCS was 593 MPa (86 ksi).

Comparative Example 1

A prepreg and cured panels were prepared as described in Example 1, except that "Torayca" T800H-12K-40B was used as the carbon fiber bundle.

The tackiness of the prepreg was "Poor", being inferior compared to Examples 1 and 2. The CILS of the cured panel in an atmosphere of 82.2±5° C. after moisture absorption was 47.6 MPa (6.9 ksi), being inferior compared to Examples 1 and 2. CAI was 262 MPa (38 ksi) and LCS was 503 MPa (73 ksi).

Comparative Example 2

A prepreg and cured panels were prepared as described in Example 3, except that "Torayca" T800H-12K-40B was used as the carbon fiber bundle.

The tackiness of the prepreg was "Rather poor", being inferior compared to Examples 3 and 4. The CILS of the cured panel in an atmosphere of 82.2±5° C. after moisture absorption was 49.0 MPa (7.1 ksi), being inferior compared to Examples 3 and 4. CIA was 345 MPa (50 ksi) and LCS was 510 MPa (74 ksi).

Comparative Example 3

A prepreg and cured panels were prepared as described in Example 5, except that "Torayca" T800H-12K-40B was used as the carbon fiber bundle.

The tackiness of the prepreg was "Rather poor", being inferior to Examples 5 and 6. The CILS of the cured panel in an atmosphere of 82.2±5° C. after moisture absorption was 33.1 MPa (4.8 ksi), being inferior compared to Examples 5 and 6. CAI was 324 MPa (47 ksi) and LCS was 517 MPa (75 ksi).

Comparative Example 4

A prepreg and cured panels were prepared as described in Example 7, except that "Torayca" T800H-12K-40B was used as the carbon fiber bundle.

The tackiness of the prepreg was "Rather poor", being inferior compared to Example 7. The CILS of the cured panel in an atmosphere of 82.2±5° C. after moisture absorption was 34.5 MPa (5.0 ksi), being inferior to Example 7. CAI was 303 MPa (44 ksi) and LCS was 503 MPa (73 ksi).

The results of the above examples of the present invention and comparative examples are shown in Tables 1 to 3.

TABLE 1

|  | Example 1 | Example 2 | Example 3 | Example 4 |
|---|---|---|---|---|
| Carbon fiber bundle | M30G | T700S | M30G | T700S |
| Composite strengths |  |  |  |  |
| CILS: H/W |  |  |  |  |
| (ksi) | 7.3 | 8.5 | 7.6 | 7.8 |
| (Mpa) | 50.3 | 58.6 | 52.4 | 53.8 |
| CAI |  |  |  |  |
| (ksi) | 35 | 40 | 36 | 43 |
| (Mpa) | 241 | 276 | 215 | 297 |
| LCS |  |  |  |  |
| (ksi) | 84 | 86 | 83 | 85 |
| (Mpa) | 579 | 593 | 572 | 586 |
| Prepreg surface smoothness | ◯ | ◯ | ◯~◎ | ◯~◎ |
| Tackiness (Kg) |  |  |  |  |
| 0-day | 2.20 | 1.47 | 1.99 | 2.09 |
| After having been left to stand for 7 days | 1.82 | 1.05 | 1.38 | 1.67 |
| After having been left to stand for 14 days | 1.39 | 0.86 | 1.25 | 1.45 |

TABLE 2

|  | Example 5 | Example 6 | Example 7 |
|---|---|---|---|
| Carbon fiber bundle | M30G | T700S | T700S |
| Composite strengths |  |  |  |
| CILS: H/W |  |  |  |
| (ksi) | 5.0 | 6.4 | 6.1 |
| (Mpa) | 34.5 | 44.1 | 42.1 |
| CAI |  |  |  |
| (ksi) | 37 | 38 | 40 |
| (Mpa) | 255 | 262 | 276 |
| LCS | 86 | 89 | 86 |
| (ksi) | 593 | 614 | 593 |
| (Mpa) |  |  |  |
| Prepreg surface smoothness | ◯~◎ | ◯~◎ | ◎ |
| Tackiness (Kg) |  |  |  |
| 0-day | 1.93 | 2.02 | 2.30 |
| After having been left to stand for 7 days | 1.43 | 1.49 | 1.88 |
| After having been left to stand for 14 days | 1.23 | 1.33 | 1.47 |

TABLE 3

|  | Comparative Example 1 | Comparative Example 2 | Comparative Example 3 | Comparative Example 4 |
|---|---|---|---|---|
| Carbon fiber bundle | T800H | T800H | T800H | T800H |
| Composite strengths |  |  |  |  |
| CILS: H/W |  |  |  |  |
| (ksi) | 6.9 | 7.1 | 4.8 | 5.0 |
| (Mpa) | 47.6 | 49.0 | 33.1 | 34.5 |
| CAI |  |  |  |  |
| (ksi) | 38 | 50 | 47 | 44 |
| (Mpa) | 262 | 345 | 324 | 303 |
| LCS |  |  |  |  |
| (ksi) | 73 | 74 | 75 | 73 |
| (Mpa) | 503 | 510 | 517 | 503 |
| Prepreg surface smoothness | X | Δ | Δ | Δ |
| Tackiness (Kg) |  |  |  |  |
| 0-day | 0.12 | 0.47 | 0.80 | 0.60 |
| After having been left to stand for 7 days | 0.06 | 0.12 | 0.36 | 0.18 |
| After having been left to stand for 14 days | 0.00 | 0.02 | 0.12 | 0.04 |

Industrial Applicability

The carbon fiber prepreg of the present invention is characterized in that a carbon fiber bundle comprising a plurality of continuous carbon filaments and having a hook drop value of 10 cm or more as the degree of fiber entanglement is impregnated with a base resin mainly composed of a thermosetting resin, and that particles of 150 μm or less in particle size made of a thermoplastic resin account for 20 wt % or less based on the weight of the entire prepreg and distributed at a higher concentration in the surface zone than in the inside.

The carbon fiber prepreg of the present invention is good in tackiness and less changing in tackiness with the lapse of time, and can form a composite with an excellent compression interlaminar shear strength (CILS) at high temperature after moisture absorption while maintaining good impact resistance. It also allows the production of a composite very higher than the conventional composite in the compressive strength (LCS) of a cross laminated panel.

The carbon fiber prepreg of the present invention can be preferably used as a structural member in such areas as aerospace area, sporting area and civil engineering and architecture area.

What is claimed is:

1. A carbon fiber prepreg, characterized in that a carbon fiber bundle comprising a plurality of continuous carbon filaments and having a hook drop value of 10 cm or more as the degree of fiber entanglement is impregnated with a base resin mainly composed of a thermosetting resin, and that particles of 150 μm or less in particle size made of a thermoplastic resin account for 20 wt % or less based on the weight of the entire prepreg and distributed at a higher concentration in the surface zone than in the inside.

2. A carbon fiber prepreg, according to claim 1, wherein the thermosetting resin is an epoxy resin.

3. A carbon fiber prepreg, according to claim 1 or 2, wherein the thermoplastic resin is at least one or more resins selected from the group consisting of polyamides, polyallylates, polyamidimides, polyimides, polyether imides, polysulfones, polyether sulfones and polyaramid, and the particle size is 3 μm to 60 μm.

4. A carbon fiber prepreg, according to claim 1 or 2, wherein the tensile strength of the carbon fiber bundle is 4,400 MPa or more.

5. A carbon fiber prepreg, according to claim 3, wherein the tensile strength of the carbon fiber bundle is 4,400 MPa or more.

6. A carbon fiber prepreg, according to claim 4, wherein the tensile strength of the carbon fiber bundle is 5,000 MPa or more; the elastic modulus is 270 GPa or more; and the density is 1.76 g/cm$^3$ or less.

7. A carbon fiber prepreg, according to claim 5, wherein the tensile strength of the carbon fiber bundle is 5,000 MPa or more; the elastic modulus is 270 GPa or more; and the density is 1.76 g/cm$^3$ or less.

8. A carbon fiber prepreg, according to claim 1 or 2, wherein the carbon filaments are substantially circular in cross sectional form.

9. A carbon fiber prepreg, according to claim 3, wherein the carbon filaments are substantially circular in cross sectional form.

10. A carbon fiber prepreg, according to claim 4, wherein the carbon filaments are substantially circular in cross sectional form.

11. A carbon fiber prepreg, according to any one of claims 5 through 7, wherein the carbon filaments are substantially circular in cross sectional form.

12. A process for producing a carbon fiber prepreg comprising the steps of
(a) preparing a sheet formed by a carbon fiber bundle comprising a plurality of continuous carbon filaments and having a hook drop value of 10 cm or more as the degree of fiber entanglement,
(b) preparing a resin coated film in which a releasable film is coated with a matrix resin obtained by mixing a base resin mainly composed of a thermosetting resin and particles with a particle size of 150 μm or less made of a thermoplastic resin in an amount corresponding to 20 wt % or less of the prepreg to be completed,
(c) forming a laminated sheet in which the resin coated film is overlaid on the sheet formed by the carbon fiber bundle, in such a manner that the matrix resin contacts the surface of the sheet formed by the carbon fiber bundle, and
(d) forming a formed resin impregnated product, in which the clearances between a plurality of carbon filaments of the carbon fiber bundle are impregnated with the base resin, by heating and pressing the laminated sheet.

13. A process for producing a carbon fiber prepreg comprising the steps of
(a) preparing a sheet formed by a carbon fiber bundle comprising a plurality of continuous carbon filaments and having a hook drop value of 10 cm or more as the degree of fiber entanglement,
(b) preparing a first resin coated film in which a first releasable film is coated with a base resin mainly composed of a thermosetting resin,
(c) forming a first laminated sheet in which the first resin coated film is overlaid on the sheet formed by the carbon fiber bundle, in such a manner that the base resin contacts the surface of the sheet formed by the carbon fiber bundle,
(d) forming a first formed resin impregnated product, in which the clearances between a plurality of carbon filaments of the carbon fiber bundle are impregnated with the base resin, by heating and pressing the laminated sheet, (e) preparing a second resin coated film in which a second releasable film is coated with a matrix resin obtained by mixing a base resin mainly composed of a thermosetting resin and particles with a particle size of 150 µm or less made of a thermoplastic resin in an amount corresponding to 20 wt % or less of the prepreg to be completed, (f) forming a second laminated sheet in which the second resin coated film is overlaid on the first formed resin impregnated product, in such a manner that the matrix resin of the second resin coated film contacts the surface of the first formed resin impregnated product, and (g) heating and pressing the second laminated sheet, for forming the second formed resin impregnated product where the matrix resin and the base resin are integrated.

* * * * *